US011784903B1

(12) United States Patent
Dukes et al.

(10) Patent No.: US 11,784,903 B1
(45) Date of Patent: Oct. 10, 2023

(54) LOSS MEASUREMENT ON A LINK WITH REORDERING

(71) Applicant: Cisco Technology, Inc., San Jose, CA (US)

(72) Inventors: Darren Russell Dukes, Ottawa (CA); Radu Teodor Valceanu, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/707,630

(22) Filed: Mar. 29, 2022

(51) Int. Cl.
*H04L 43/0829* (2022.01)
*H04L 43/0894* (2022.01)
*H04L 43/062* (2022.01)
*H04L 43/0817* (2022.01)
*H04L 43/12* (2022.01)

(52) U.S. Cl.
CPC ........ *H04L 43/0841* (2013.01); *H04L 43/062* (2013.01); *H04L 43/0817* (2013.01); *H04L 43/0894* (2013.01); *H04L 43/12* (2013.01)

(58) Field of Classification Search
None
See application file for complete search history.

(56) References Cited

U.S. PATENT DOCUMENTS

| 2006/0050649 | A1 | 3/2006 | Botton-Dascal et al. |
| 2014/0226514 | A1 | 8/2014 | Zhou |
| 2016/0373329 | A1 | 12/2016 | Chan et al. |
| 2018/0220283 | A1 | 8/2018 | Condeixa et al. |
| 2019/0260657 | A1 | 8/2019 | Filsfils et al. |

FOREIGN PATENT DOCUMENTS

WO    2021175861 A1    9/2021

OTHER PUBLICATIONS

Author: Frost et al. Title: "Packet Loss and Delay Measurement for MPLS Networks" Publisher: Internet Engineering Task Force (IETF) RFC6374 (Year: 2011).*
Author: Fioccola et al Title: "Alternate-Marking Method for Passive and Hybrid Performance Monitoring" Publisher: Internet Engineering Task Force (IETF) RFC8321 (Year: 2018).*

(Continued)

*Primary Examiner* — John A Follansbee
*Assistant Examiner* — Kamal M Hossain
(74) *Attorney, Agent, or Firm* — Baker Botts L.L.P.

(57) ABSTRACT

According to certain embodiments, a method determines a number of transmitted packets that a first node transmitted to a second node via a link and a number of received packets that the second node received from the first node via the link. The number of transmitted packets and the number of received packets are determined for each interval of a plurality of intervals. The method further comprises determining a plurality of packet loss values. Each packet loss value is associated with a respective interval and is determined based on the number of transmitted packets and the number of received packets associated with the respective interval. The method further comprises determining variability based on the plurality of packet loss values and configuring a value associated with reordering detection based on whether the variability exceeds a threshold.

17 Claims, 4 Drawing Sheets

(56) References Cited

OTHER PUBLICATIONS

Author: Wang et al Title: "Every Packet Counts: Fine-Grained Delay and Loss Measurement with Reordering" Publisher: IEEE DOI 10.1109/ICNP.2014.30 (Year: 2014).*
J. Wang, S. Lian, W. Dong, X.-Y. Li and Y. Liu, "Every Packet Counts: Loss and Reordering Identification and Its Application in Delay Measurement," in IEEE/ACM Transactions on Networking, vol. 24, No. 6, pp. 3426-3438, Dec. 2016, doi: 10.1109/TNET.2016.2523127.
RFC 6374, Packet Loss and Delay Measurement for MPLS Networks, https://datatracker.ietf.org/doc/html/rfc6374.
RFC 8321, Alternate-Marking Method for Passive and Hybrid Performance Monitoring, https://datatracker.ietf.org/doc/html/rfc8321.
International Search Report and Written Opinion corresponding to PCT/US2023/015611, dated Jun. 27, 2023, 15 pages.
Sharad Jaiswal et al., "Measurement and Classification of Out-of-Sequence Packets in a Tier-1 IP Backbone", IEEE / ACM Transactions on Networking, IEEE / ACM, New York, NY, US vol. 15, No. 1, Feb. 1, 2007 (Feb. 1, 2007), pp. 54-66, XP011165576, ISSN: 1063-6692, DOI: 10.1109/TNET.2006,890117 abstract.

\* cited by examiner

| Example Values | | | | |
|---|---|---|---|---|
| Probe Color | Interval | Tx Packets | Rx Packets | Packet Loss per Interval (Tx-Rx) | Average Loss Per Interval (Tx-Rx) / Tx |
| w | 1 | 800 | 600 | 200 | +0.25 |
| x | 2 | 1000 | 1300 | -300 | -0.30 |
| y | 3 | 1200 | 900 | 300 | +0.25 |
| z | 4 | 400 | 100 | 300 | +0.75 |

Weighted Loss (T0) to (T4)

| Variability | $V_{Threshold} = 0.2$ |
|---|---|
| Number of elements in the sliding window (N) | $N = 4$ |
| $i = 1..N$ | $i = 1..4$ |
| Weighting Factor | If $V > V_{Threshold}$, then 1<br>If $V \leq V_{Threshold}$, then $i^2 / N^2$ |
| Weighted Loss (T0) to (T4) | LossAB = SUMI = 1..N (Weight * LossABI) / SUMI = 1..N (Weight) |

- 302 DETERMINING, BASED ON A COUNTER MAINTAINED BY A FIRST NODE, A NUMBER OF TRANSMITTED PACKETS THAT THE FIRST NODE TRANSMITTED TO A SECOND NODE VIA A LINK, THE NUMBER OF TRANSMITTED PACKETS DETERMINED FOR EACH INTERVAL OF A PLURALITY OF INTERVALS

- 304 DETERMINING, BASED ON A COUNTER MAINTAINED BY THE SECOND NODE, A NUMBER OF RECEIVED PACKETS THAT THE SECOND NODE RECEIVED FROM THE FIRST NODE VIA THE LINK, THE NUMBER OF RECEIVED PACKETS DETERMINED FOR EACH INTERVAL OF THE PLURALITY OF INTERVALS

- 306 DETERMINING A PLURALITY OF PACKET LOSS VALUES, EACH PACKET LOSS VALUE ASSOCIATED WITH A RESPECTIVE INTERVAL OF THE PLURALITY OF INTERVALS, THE DETERMINING BASED ON THE NUMBER OF TRANSMITTED PACKETS AND THE NUMBER OF RECEIVED PACKETS ASSOCIATED WITH THE RESPECTIVE INTERVAL

- 308 DETERMINING VARIABILITY BASED ON THE PLURALITY OF PACKET LOSS VALUES

- 310 CONFIGURING A VALUE ASSOCIATED WITH REORDERING DETECTION BASED ON WHETHER THE VARIABILITY EXCEEDS A THRESHOLD

- 312 DETERMINING A WEIGHTED PACKET LOSS VALUE ASSOCIATED WITH A SLIDING WINDOW, THE WEIGHTED PACKET LOSS VALUE DETERMINED BASED ON A WEIGHTING FACTOR, THE WEIGHTING FACTOR DEPENDING ON THE VALUE ASSOCIATED WITH REORDERING DETECTION

- 314 COMMUNICATING THE WEIGHTED PACKET LOSS VALUE

*FIG. 3*

LOSS MEASUREMENT ON A LINK WITH REORDERING

TECHNICAL FIELD

Certain embodiments relate, in general, to loss measurement on a link with reordering.

BACKGROUND

In general, a loss measurement may indicate traffic loss on a link. For example, suppose a first node and a second node communicate via the link. Traffic loss can be detected if the first node sends traffic to the second node via the link, but the second node fails to receive at least a portion of the traffic from the first node.

BRIEF DESCRIPTION OF THE DRAWINGS

FIG. 1A illustrates a loss measurement approach based on prior art, and FIG. 1B illustrates a loss measurement approach in accordance with certain embodiments of the present disclosure.

FIGS. 2A-2C illustrate an example of determining loss on a link with reordering, in accordance with certain embodiments.

FIG. 3 illustrates an example of a method of determining loss on a link with reordering, in accordance with certain embodiments.

DESCRIPTION OF EXAMPLE EMBODIMENTS

Overview

Figure 1A:
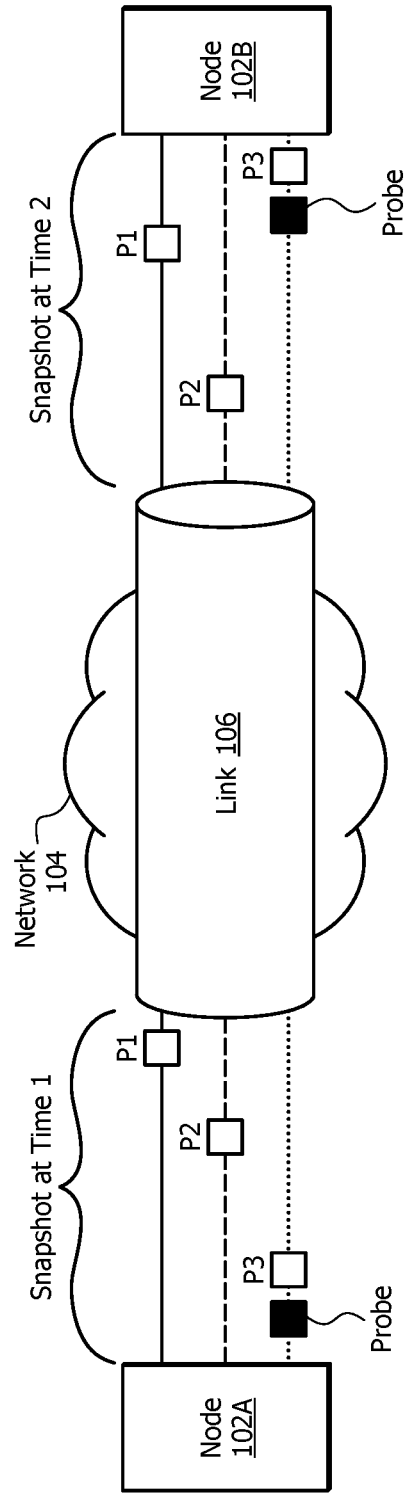
FIGS. 1A and 1B each illustrate an example of a network comprising a link with reordering.

According to an embodiment, a computing system comprises one or more processors and one or more computer-readable non-transitory storage media comprising instructions that, when executed by the one or more processors, cause one or more components of the computing system to perform operations. The operations comprise determining, based on a counter maintained by a first node, a number of transmitted packets that the first node transmitted to a second node via a link. The operations further comprise determining, based on a counter maintained by the second node, a number of received packets that the second node received from the first node via the link. The number of transmitted packets and the number of received packets are determined for each interval of a plurality of intervals. The operations further comprise determining a plurality of packet loss values. Each packet loss value is associated with a respective interval of the plurality of intervals. Determining the packet loss value is based on the number of transmitted packets and the number of received packets associated with the respective interval. The operations further comprise determining variability based on the plurality of packet loss values and configuring a value associated with reordering detection based on whether the variability exceeds a threshold.

According to another embodiment, a method performed by a computing system comprises determining, based on a counter maintained by a first node, a number of transmitted packets that the first node transmitted to a second node via a link. The method further comprises determining, based on a counter maintained by the second node, a number of received packets that the second node received from the first node via the link. The number of transmitted packets and the number of received packets are determined for each interval of a plurality of intervals. The operations further comprise determining a plurality of packet loss values. Each packet loss value is associated with a respective interval of the plurality of intervals. Determining the packet loss value is based on the number of transmitted packets and the number of received packets associated with the respective interval. The operations further comprise determining variability based on the plurality of packet loss values and configuring a value associated with reordering detection based on whether the variability exceeds a threshold.

According to yet another embodiment, one or more computer-readable non-transitory storage media may embody instructions that, when executed by a processor of a computing system, cause the performance of operations. The operations comprise determining, based on a counter maintained by a first node, a number of transmitted packets that the first node transmitted to a second node via a link. The operations further comprise determining, based on a counter maintained by the second node, a number of received packets that the second node received from the first node via the link. The number of transmitted packets and the number of received packets are determined for each interval of a plurality of intervals. The operations further comprise determining a plurality of packet loss values. Each packet loss value is associated with a respective interval of the plurality of intervals. Determining the packet loss value is based on the number of transmitted packets and the number of received packets associated with the respective interval. The operations further comprise determining variability based on the plurality of packet loss values and configuring a value associated with reordering detection based on whether the variability exceeds a threshold.

Technical advantages of certain embodiments of this disclosure may include one or more of the following. Certain embodiments detect variability in packet reordering. Certain embodiments determine a weighting factor used in calculating packet loss based on whether variability in packet reordering has been detected. This may allow for packet loss to be calculated more accurately. Certain embodiments improve responsiveness to packet loss. As an example, certain embodiments may be able to react faster based on packet loss measurements associated with links with less reordering. Certain embodiments measure and adapt to the variability of the reordering in order to calculate loss without coloring traffic or maintaining additional per-color counters.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In a network, nodes may communicate via a link, such as a single-hop link or a multi-hop link. Traffic loss is often detected on a link between nodes by use of probe packets. For example, traffic loss may be detected using bidirectional forwarding detection (BFD). However, this does not account for all loss on a link. A better solution may be to count packets sent and received on a link between nodes. For example, Internet Engineering Task Force (IETF) Request for Comments (RFC) 6374 describes a solution that determines traffic loss based on counting packets. The solution of RFC 6374 is summarized below for one direction of a link:

Step 1. Two nodes (node A and node B) are connected to a unidirectional link. The link from node A to node B is called link AB. Node A transmits packets to node B, and node B receives packet from node A. Transmission and reception may be abbreviated Tx and Rx, respectively.

Step 2. Packet counters are maintained for link AB at each node:
  Node A maintains counter ABtx; and
  Node B maintains counter ABrx.

Step 3. Node A periodically sends node B a control packet containing ABtx:
  Node A sends ABtx1 at time 1.
  Node A sends ABtx2 at time 2.

Step 4. Upon receipt of a control packet, node B replies to node A with a control packet containing node B's current ABrx counter:
  Upon receipt of ABtx1, node B sends a control packet containing ABrx1; and
  Upon receipt of ABtx2, node B sends a control packet containing ABrx2.

Step 5. Upon receipt of ABrx1 and ABrx2, node A computes loss on link AB by comparing the difference in TX and RX counters. For example, node A computes the loss based on the equation Loss=(ABtx2-ABtx1)−(ABrx2-ABrx1), where (ABtx2-ABtx1) indicates the packets that node A transmitted to node B during the time interval from time 1 to time 2, and where (ABrx2-ABrx1) indicates the packets that node B received from node A during the time interval from time 1 to time 2.

As further explained below with respect to FIG. 1A, the above-described solution from RFC 6374 does not accurately detect loss when there is reordering of packets on a link. Certain embodiments of the present disclosure may provide a solution to this and other problems.

Figure 1B:
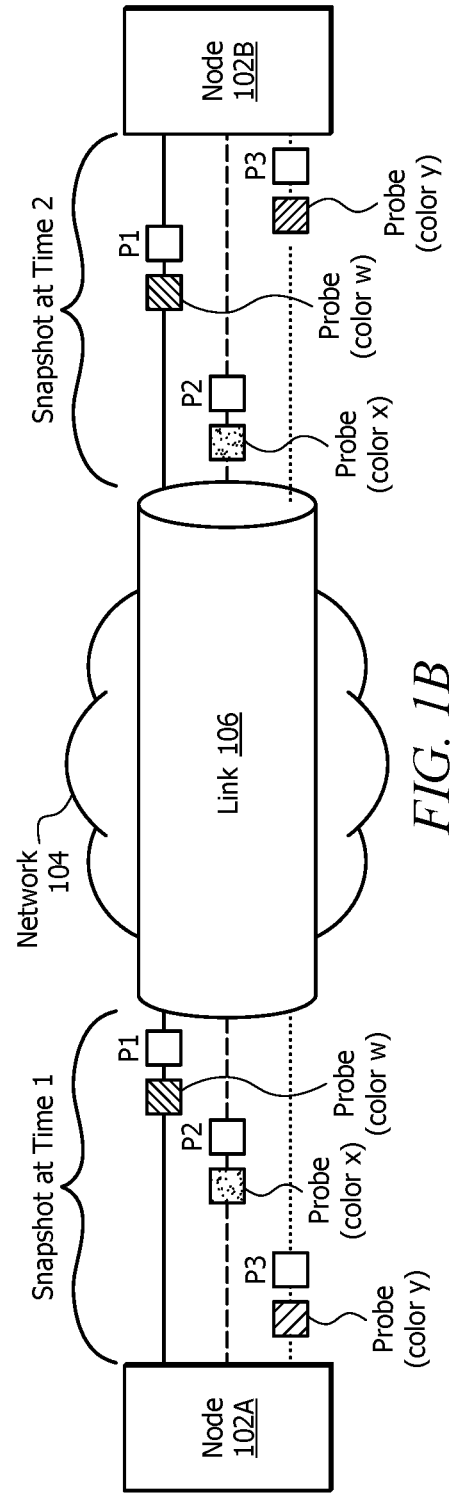

FIGS. 1A and 1B each illustrate an example of a network comprising a link with reordering. FIG. 1A illustrates a loss measurement approach based on RFC 6374, and FIG. 1B illustrates a loss measurement approach in accordance with certain embodiments of the present disclosure. In the examples of FIG. 1A and FIG. 1B, a first node 102A communicates with a second node 102B via a network 104. For example, the network 104 comprises a link 106 (a single-hop link or a multi-hop link) that communicates packets from the first node 102A to the second node 102B and/or from the second node 102B to the first node 102A.

In each of the examples of FIGS. 1A and 1B, the first node 102A sends packets P1, P2, and P3 to the second node 102B (as shown in the snapshot taken at a first time), and the second node 102B receives the packets P1, P2, and P3 from the first node 102A (as shown in the snapshot taken at a second time). Each packet may comprise a respective type of traffic. As an example, P1 may include e-mail traffic, P2 may include traffic associated with an office application (such as a word processing application, a spreadsheet application, a slide presentation application, etc.), and P3 may include audio traffic. Other implementations may send other types of traffic in the packets.

The first node 102A sends the packets in an order. In each of the examples of FIGS. 1A and 1B, the first node 102A sends P1 first, followed by P2 second, followed by P3 third. Changes in packet order (reordering) may occur as the packets traverse link 106. The changes in packet order may be due to various reasons, such as outer type of service (TOS) or traffic class (TC) value differences resulting in different paths, a Quality of Service (QOS) policy (very common), per packet load balancing (less common), link or node failure or rebalancing (less common, unpredictable), or other reason. As a result of reordering, instead of receiving the packets in the order that the packets were sent by the first node 102A (i.e., the order P1, P2, P3), the second node 102B actually receives the packets in a different order: P3 first, followed by P1 second, followed by P2 third.

Focusing now on FIG. 1A, the figure illustrates an example of determining a loss measurement based on the approach of RFC 6374. In the approach of RFC 6374, the first node 102A sends a control packet (probe) to the second node 102B after sending packet P3. This approach fails to accurately detect loss because the reordering has caused the control packet (probe) to be received by the second node 102B before the second node 102B receives packet P1 and packet P2.

Other approaches for determining loss measurement may present challenges of their own. For example, RFC 8321 proposes a method of loss measurement that may be used when nodes are connected via a complex network or networks where each flow between the nodes may have a different latency. RFC 8321 suggests maintaining colored counters at each node and coloring all traffic between nodes. For example, a flow comprising a first type of traffic may be colored a first color, and a flow associated with a second type of traffic may be colored a second color. The RFC 8321 approach then detects packet loss based on the per-color counters. Therefore, the RFC 8321 solution requires maintaining a respective counter for each flow. RFC 8321 distributes information from each counter using interior gateway protocol (IGP) to indicate loss per color on a link. Unfortunately, the approach proposed by RFC 8321 increases complexity and may be impractical. As an example, some platforms cannot maintain multiple packet counters per endpoint because counters are scarce. As another example, any coloring scheme and colors must be negotiated between all endpoints for all possible flows in order for the approach proposed by RFC 8321 to work properly (so that each per-color counter counts packets of the correct color). This may result in the source explicitly adding color information to packets via yet to be defined methods that could include Multi-Protocol Label Switching (MPLS) entropy labels, Internet Protocol (IP) version 6 (v6) (together, IPv6) flow labels, additional encapsulations, etc. This may significantly increase overhead in the network.

Figure 4:
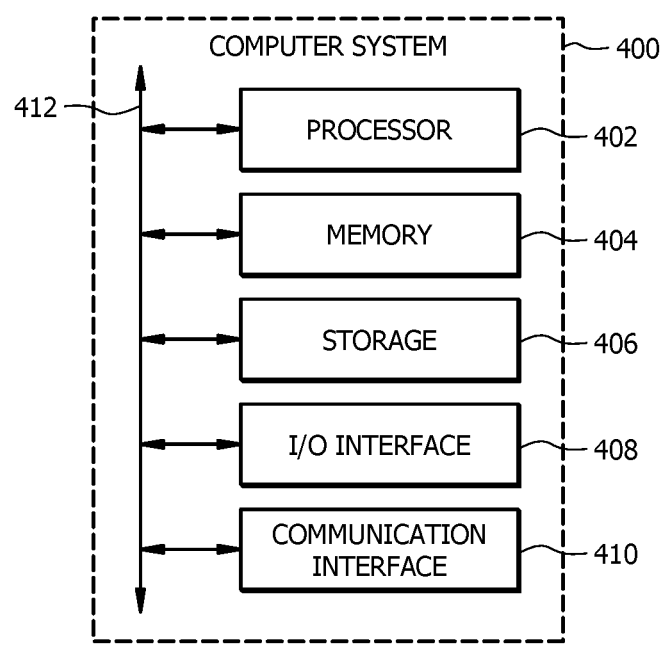
FIG. 4 illustrates an example of a computer system, in accordance with certain embodiments.

Certain embodiments of the present disclosure may provide a solution to this and other problems. Turning to FIG. 1B, in certain embodiments of the present disclosure, anode 102 generally represents any suitable node that communicates with another node 102 via a link 106 for which loss is to be measured. Examples of a node 102 may include an endpoint, a switch, a router, a gateway, a user device, etc. Network 104 generally represents any suitable network, portion of a network, or combination of networks to facilitate communication between nodes 102. In an embodiment, the first node 102A may be an endpoint located at a branch office associated with an organization, and the second node 102B may be an endpoint located at a campus, a data center (DC), or a virtual private cloud (VPC) associated with the organization. In certain embodiments, link 106 between the first node 102A and the second node 102B comprises a tunnel. Further examples are described below with respect to FIG. 4, which describes a computer system 400 that may be used to implement a node 102. FIG. 4 also describes examples of networks with which the computer system 400 may communicate.

In general, the embodiment illustrated in FIG. 1B sends a probe per observed flow (or subset of flows). FIG. 1B illustrates the first network node 102A as sending a first probe associated with a first color (color w) with respect to a first flow (the flow comprising packet P1), a second probe associated with a second color (color x) with respect to a second flow (the flow comprising packet P2), and a third probe associated with a third color (color y) with respect to a third flow (the flow comprising packet P3). The probes may be used to detect reordering variability, and a calculation for determining the loss measurement may be based on the reordering variability. For example, one calculation may be used if the reordering variability is below a threshold, and a different calculation may be used if the reordering variability is above the threshold.

For loss measurement on links with reordering (within or between flows), certain embodiments measure and adapt to the variability of the reordering in order to calculate loss without coloring traffic or maintaining additional per-color counters.

Certain embodiments detect variability in packet reordering. For context, in a steady-state system where traffic rates per flow are constant, variability in packet reordering on a link 106 tends to be unlikely. Thus, in a steady state system, loss is easily calculated on the link 106 using prior methods. However, steady-state is unlikely in real-world implementations. Certain embodiments may detect variability in packet reordering in order to facilitate a more accurate calculation of loss on the link 106.

Certain embodiments detect variability in reordering by probing loss using control packets of varying color. As examples, certain embodiments change the color via IPv4 TOS or IPv6 TC and flow label change. Colors matching various flows on the link 106 can be changed at each loss measurement interval. Coloring the control packet occurs at the transmitting node (e.g., the first node 102A). Packets may be colored to match a sample of flows on the link 106. Sampling flows on the link 106 may be achieved using NetFlow or other suitable means.

The source (e.g., the first node 102A) can change the type of service, traffic class, or flow label bits in the header of packet. The source may change some bits in a packet to indicate to another node (a node on the other end of the link 106, such as the second node 102B) that the packet is now a different color. The second node 102B may be directly connected (e.g., direct wire) or indirectly connected (e.g., via the Internet, over Internet Protocol Security (IPSec), over a Secure Sockets Layer (SSL) tunnel, etc.). The source can change some aspect of the packet to allow for matching the colors at both ends of the link 106. The colors are matched to see variability in the loss of the colors. Variability in reordering can be detected based on whether positive loss or negative loss is detected, as further explained below.

As the source changes the probe color based on the traffic, positive or negative losses will be detected. Variability in the loss indicates that reordering has been detected. In an example, the source can send a first probe comprising a probe color indicator (e.g., a bit) set to a first color (e.g., color 0) at a first time (e.g., T0), a second probe comprising a probe color indicator set to a second color (e.g., color 1) at a second time (e.g., T1), and so on. A request for a counter value can be made once the probe color has changed. To detect reordering, the change of color is made to the probe itself, not to the traffic. The traffic on a link will include various colors (e.g., various TOS values) which can go on different paths or can receive different QoS treatment. Reordering can happen based on prioritization (e.g., traffic can be prioritized based on TOS/TC/color). If there is reordering, loss measurements calculated based on methods such as that described by RFC 6374 are not accurate, so embodiments of the present disclosure provide a solution.

For a link AB (e.g., the link 106 between the first node 102A and the second node 102B), certain embodiments configure a first counter (Tx counter) on the first node 102A and a second counter (Rx counter) on the second node 102B. The counters monitor flows between the first node 102A and the second node 102B. Probes are colored to match the flows. Each probe from the first node 102A to the second node 102B asks the second node 102B to return the current counter. The first node 102A sends multiple probes for each color/flow type detected on the link 106. The first node 102A detects variability based on observing different losses for the different colored probe packets between the first node 102A and the second node 102B. The variability in the losses indicates reordering. Certain embodiments measure loss aggregated over a set of measurements obtained per flow.

Certain embodiments compute loss differently when reordering exceeds a threshold (which indicates reordering detected) versus when reordering does not exceed the threshold (which indicates no or minimal reordering detected), for example:

Reordering detected: loss is computed over an average of a sliding window of multiple loss measurements. As an example, the window may be equal to the set of loss measurement colored probes. As another example, the window may be equal to a multiple to the set of loss measurement colored probes (such as when few colors are present).

Reordering not detected or minimally detected: loss is computed over a weighted average of the same sliding window, but heavily favoring the most recent measurements.

With this solution, loss is more accurately calculated for a set of flows with or without packet reordering. This may allow measurements to be reacted to faster on links 106 with less reordering.

Certain embodiments determine loss without maintaining per-flow counters and without explicitly coloring traffic to match probes. As an example, in an embodiment:

Step 1. Two endpoints (e.g., the first node 102A and the second node 102B) are connected to a link (e.g., link 106). The link 106 from the first node 102A to the second node 102B may be referred to as link AB. For purposes of the example, link 106 may be unidirectional.

Step 2. Packet counters are maintained for link AB at each endpoint
At the first node 102A, counter ABtx is maintained.
At the second node 102B, counter ABrx is maintained.

Step 3. The first node 102A learns the color of each traffic flow for link AB. The first node 102A can learn this information using network monitoring tools (like Net-Flow) or in another suitable manner. For example, a forwarding plane can inform the control plane of the color of the forwarded traffic for the examined link AB. A simple aging mechanism can be maintained for the detected colors, as well.

Step 4. The first node 102A periodically sends the second node 102B a control packet containing the value of ABtx.
At time 1, the first node 102A sends ABtx1 to the second node 102B. ABtx1 is sent matching the first traffic color learned for the examined link AB.

At time 2, the first node 102A sends ABtx2 to the second node 102B. ABtx2 is sent matching the second traffic color learned for the examined link AB.

Step 5. Upon receipt, the second node 102B replies with a control packet containing its current value for the ABrx counter.

Upon receipt of ABtx1, the second node 102B sends the first node 102A a control packet containing ABrx1.

Upon receipt of ABtx2, the second node 102B sends the first node 102A a control packet containing ABrx2.

Step 6. Upon receipt of ABrx1 and ABrx2, the first node 102A computes loss on link AB by comparing the difference in the TX and RX counters.

LossAB2=(ABtx2−ABtx1)−(ABrx2−ABrx1)

Step 7. Repeat Steps 4-6 until all learned flow colors have been exhausted.

Step 8. To increase probability of detecting variability of reordering, Steps 4-7 can be repeated multiple times.

Step 9. All loss values resulted from steps 4-8 are maintained in a sliding window.

Step 10. Compute ReorderingDetected as TRUE or FLASE:

ReorderingDetected=TRUE if at least, X % of Loss values in the sliding window are negative. As an example, X % may be set to 10% in certain embodiments.

ReorderingDetected=FALSE in all other cases.

Step 11. Compute Weight for each $LossAB_i$ value in the sliding window (i=1 . . . N, where N is number of elements in the sliding window):

Weight; $=i^2/N^2$, if ReorderingDetected=FALSE,

Weight=1, if ReorderingDetected=TRUE,

Step 12. Compute Loss for the current sliding window:

$LossAB = SUM_{i=1 \ldots N}(Weigh*LossAB_i)/SUM_{i=1 \ldots N}(Weight)$

Where N is the number of elements in the sliding window.

In an embodiment, the first node 102A maintains one TX counter, and the second node 102B maintains one RX counter. The probe from the first node 102A asks the second node 102B to provide the current counter value at the second node 102B. The first node 102A compares the counter indicating the number of packets sent from the first node 102A to the second node 102B (e.g., 1000 packets) to the counter indicating the number of packets received by the second node 102B from the first node 102A. No reordering is detected if the second node 102B's counter is equal to the first node 102A's counter or if the second node 102B's counter is less than the first node 102A's counter (which indicates some loss occurred). If there is only one flow/color, the first node 102A could simply send control packet 1 at time 1, send control packet 2 at time 2, and measure an increasing amount of loss since the count started (transmitted packet count minus received packet count). However, suppose there are different flows traversing the link 106, such as a video flow, an email flow, etc. A first control packet may be sent for the color associated with video, a second control packet may be sent for the color associated with email, etc. Certain embodiments observe if there is reordering for a particular type of traffic. By observing the counter values at intervals associated with all the different types of traffic that have different treatment, reordering variability can be detected (if present) and loss can be calculated based on if reordering is detected.

In summary, certain embodiments compute loss over a link 106 (single-hop or multi-hop link) in the presence of variable packet reordering, without requiring endpoints to maintain per-flow counters. For example, certain embodiments 1) detect variable reordering on a link, and 2) compute loss over different ranges of probes when reordering is present. Certain embodiments may be particularly important when traffic is tunneled between endpoints over multi-hop networks, for example, like a software-defined wide area network (SDWAN) over Internet links or segment routing (SR) MPLS provider edges (PEs) connected via IPSec+ Generic Routing Encapsulation (GRE) tunnels over Internet, or SRv6 PEs connected via complex networks like the North Atlantic Treaty Organization (NATO)'s protected core network (PCN).

Figures 2A, 2B:
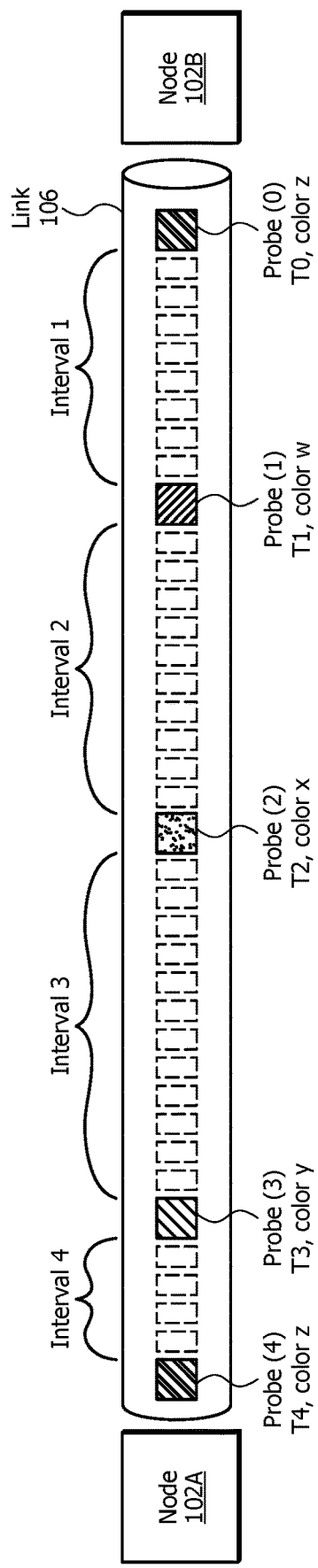

FIGS. 2A-2C illustrate an example of determining loss on a link with reordering, in accordance with certain embodiments. Similar to FIGS. 1A and 2B, FIG. 2A illustrates an example of a first node 102A that transmits packets to a second node 102B via a link 106 through a network. For purposes of discussion, FIG. 2A illustrates control packets (e.g., probes) and traffic packets from the perspective of the first node 102A. That is, FIG. 2A illustrates the order and timing of the control packets (e.g., probes) and traffic packets based on how they are transmitted by the first node 102A. The control packets (e.g., probes) and traffic packets may be received by the second node 102B in a different order (if re-ordering occurs) with different timing. In the example of FIG. 2A, the packets comprise a control packet (e.g., probe), a plurality of traffic packets, a next control packet (e.g., probe), a next plurality of traffic packets, and so on. Each probe may indicate a color. As examples, a probe may comprise a TOS, TC, flow label, and/or other information indicating the color. The probe color indicates a color of respective traffic, for example, as described above with respect to FIG. 1B.

More particularly, FIG. 2A illustrates a probe (0) sent at time T0 indicating color z, a probe (1) sent at time T1 indicating color w, a probe (2) sent at time T2 indicating color x, a probe (3) sent at time T3 indicating color y, and a probe (4) sent at time T4 indicating color z. A first interval spans from probe (0) to probe (1), a second interval spans from probe (1) to probe (2), a third interval spans from probe (2) to probe (3), and a fourth interval spans from probe (3) to probe (4). During an interval, any flow or class of traffic may be sent. Thus, one or more traffic packets for a particular interval may correspond to a different color than the color indicated by the probe in the same interval, for example, due to reordering. After probe (4), the first node 102A may continue to send packets associated with various colors (e.g., w, x, y, z, and/or other colors) and may use probes to indicate the colors.

FIG. 2B illustrates example packet counts. For example, the first network node 102A may maintain a counter ABtx that counts Tx packets transmitted to the second node 102B via link 106 for each time interval (a time interval from one probe to the next). The second network node 102B may maintain a counter ABrx that counts Rx packets received from the first node 102A via link 106 for each time interval. For purposes of example and explanation, suppose that each traffic block in FIG. 2A represents 100 traffic packets transmitted by the first node 102A. Thus, FIG. 2A illustrates that the first node 102A transmitted 800 traffic packets during the first interval; 1,000 traffic packets during the second interval; 1,200 traffic packets during the third interval; and 400 traffic packets during the fourth interval.

As noted above, the example of FIG. 2A illustrates the packets on link 106 from the perspective of the first network node 102A. That is, FIG. 2A illustrates packets that the first network node 102A transmitted during the illustrated time intervals. Depending on conditions affecting the network 104 and the link 106, such as the amount of reordering, the second node 102B may receive more, fewer, or the same number of traffic packets that the first network 102A transmitted for a particular time interval. For purposes of example and explanation, FIG. 2B supposes that the second node 102B received 600 traffic packets during the first interval; 1,300 traffic packets during the second interval; 900 traffic packets during the third interval; and 100 traffic packets during the fourth interval.

Certain embodiments compare the packets transmitted to the packets received in order to determine reordering variability from one interval to the next. As an example, in FIG. 2B traffic packet loss over the first interval is 200 lost traffic packets (i.e., 800 traffic packets transmitted by the first network node 102A minus 600 traffic packets received by the second network node 102B). Traffic packet loss over the second interval is −300 lost traffic packets (i.e., 1,300 traffic packets transmitted by the first network node 102A minus 1,000 received by the second network node 102B). The negative value for traffic packet loss may indicate reordering. For example, the first network node 102A may have transmitted certain traffic packets after probe (2), however, the second network node 102B may have received those traffic packets before probe (2) due to reordering. In FIG. 2B, traffic packet loss over the third interval is 300 lost traffic packets (e.g., 1,200 traffic packets transmitted by the first network node 102A minus 900 traffic packets received by the second network node 102B). Traffic packet loss over the fourth interval is 300 lost packets (i.e., 400 traffic packets transmitted by the first network node 102A minus 100 traffic packets received by the second network node 102B).

Certain embodiments may determine the average loss for each time interval. In the example of FIG. 2B, average traffic packet loss over the first interval is 0.25 (e.g., 200 lost traffic packets divided by 800 transmitted traffic packets). Average traffic packet loss over the second interval is −0.3 (e.g., −300 lost traffic packets divided by 1,000 transmitted traffic packets). Average traffic packet loss over the third interval is 0.25 (e.g., 300 lost traffic packets divided by 1,200 transmitted traffic packets). Average traffic packet loss over the fourth interval is 0.75 (e.g., 300 lost traffic packets divided by 400 transmitted traffic packets).

FIG. 2C illustrates an example where packet loss over a sliding window is calculated according to the equation $LossAB = SUM_{i=1 \ldots N}(Weight_i * LossAB_i)/SUM_{i=1 \ldots N}(Weight)$. In the example, i=1 . . . 4 to include the time intervals illustrated in FIGS. 2A-2B. In the example, the weighting factor (Weight) depends on reordering variability (V). For example, if V is greater than a variability threshold ($V_{Threshold}$), then certain embodiments detect reordering variability and configure the weighting factor as 1. If V is less than the variability threshold ($V_{Threshold}$), then certain embodiments detect no or minimal reordering variability and configure the weighting factor as $i^2/N^2$. If V equals the variability threshold ($V_{Threshold}$), the calculation may be configured to either detect reordering variability or to not detect reordering variability, depending on the embodiment. FIG. 2C illustrates an example where the calculation is configured to detect no or minimal reordering variability if V equals the variability threshold ($V_{Threshold}$) such that the weighting factor is $i^2/N^2$.

The value of $V_{Threshold}$ can be configured for a particular implementation (e.g., one value may work well in certain implementations, another value may work well in other implementations). For purposes of example, FIG. 2C configures $V_{Threshold}$ as 0.2. That is, when measured loss for a time interval is negative or differs by more than 20% from previous measured value, then variability is observed. Thus, for the example values shown in FIG. 2B, the 'Reordering-Detected' will be set to TRUE. Because ReorderingDetected is TRUE then Weight1, Weight2, Weight3, and Weight4 each equal 1. Traffic packets transmitted over the first through fourth time intervals would be 3,400 packets (e.g., 800 packets for the first interval, plus 1,000 packets for the second interval, plus 1,200 packets for the third interval, plus 400 packets for the fourth interval). Traffic packet loss over the same period would be 500 (e.g., 200 packets for the first interval, plus (−300) packets for the second interval, plus 300 packets for the third interval, plus 300 packets for the fourth interval). Average loss would be 0.147 (e.g., 500 packets divided by 3,400 packets).

If $V_{Threshold}$ had been set in FIG. 2C such that 'ReorderingDetected' was set to FALSE, then packet loss would have been calculated differently. For example, the weighting factor would equal $i^2/N^2$, where i equals 1, 2, 3, 4, for Weight1, Weight2, Weight3, and Weight 4, respectively, and where N equals 4. Thus, in the embodiment Weight 1 would equal 1/16, Weight2 would equal 4/16, Weight3 would equal 9/16, and weight4 would equal 16/16. In this example, weighted traffic packet loss would be calculated as 200 packets multiplied by 1/16 for the first interval, plus (−300 packets) multiplied by 4/16 for the second interval, plus 300 packets multiplied by 9/16 for the third interval, plus 300 packets multiplied by 16/16 for the fourth interval. This calculation yields a weighted traffic packet loss of 406.25 packets. Weighted traffic packets transmitted would be calculated as 800 packets multiplied by 1/16 for the first interval, plus 1000 multiplied by 4/16 for the second interval, plus 1200 packets multiplied by 9/16 for the third interval, plus 400 packets multiplied by 16/16 for the fourth interval. This calculation yields a weighted traffic packet transmission value of 1,375 packets. Thus, the average weighted packet loss would be 406.25 weighted packet loss divided by 1,375 weighted packet transmissions or 0.295. In this manner, the packet loss may be weighted in a manner that gives greater weight to more recent traffic packets in the case where 'ReorderingDetected' is determined to be FALSE.

FIG. 3 illustrates an example of a method 300 of determining loss on a link with reordering, in accordance with certain embodiments. In certain embodiments, method 300 may be performed by a computing system (such as computer system 400 described below with respect to FIG. 4. For example, the computing system may comprise one or more processors and one or more computer-readable non-transitory storage media comprising instructions that, when executed by the one or more processors, cause one or more components of the computing system to perform method 300. In certain embodiments, the computing system performing method 300 may be implemented in a first network node 102A (e.g., a node that transmits packets via link 106). In other embodiments, the computing system performing method 300 may be implemented in a second network node 102B (e.g., a node that receives the packets via link 106). In other embodiments, the computing system performing method 300 may be implemented in another node or system (such as a management node that communicates with the first node 102A and the second node 102B in order to obtain counter values and then performs method 300 based on the counter values).

Method 300 begins at step 302 with determining a number of transmitted packets (e.g., Tx packets) that a first node 102A transmitted to a second node 102B via a link 106 (e.g., link AB). The number of transmitted packets is determined based on a counter maintained by the first node 102A, such as an ABtx counter. The number of transmitted packets is determined for each interval of a plurality of intervals. As an example, a first number of transmitted packets may be determined for a first interval, a second number of transmitted packets may be determined for a second interval, and so on. Any suitable number of intervals may be observed. On one hand, increasing the number of intervals observed may increase the probability of detecting variability of reordering. On the other hand, certain embodiments may observe a number of intervals that is sufficiently small to facilitate completion of method 300 within a suitable timeframe, for example, to allow the system to react promptly to packet loss measurements.

In certain embodiments, each interval is indicated by a respective first probe and a respective second probe. The respective first probe and the respective second probe are sent from the first network node 102A to the second network node 102B via the link 106. The respective first probe indicates a start of the interval and the respective second probe indicates an end of the interval. As an example, with respect to FIG. 2A, probe (0) corresponds to the first probe and probe (1) corresponds to the second probe for the first interval. Probe (1) corresponds to the first probe and probe (2) corresponds to the second probe for the second interval. Probe (2) corresponds to the first probe and probe (3) corresponds to the second probe for the third interval. Probe (3) corresponds to the first probe and probe (4) corresponds to the second probe for the fourth interval. In certain embodiments, the respective first probe indicates a first type of traffic (e.g., first color) and the respective second probe indicates a second type of traffic (e.g., second color). For example, TOS, TC, flow label, QoS priority information, and/or other information may be used to indicate the type of traffic (e.g., traffic color). Certain embodiments use the probes to indicate the type of traffic (e.g., the traffic color either preceding the probe or following the probe, depending on the embodiment) such that the traffic packets themselves are not required to be colored. FIG. 2A illustrates an example where probes (0), (1), (2), (3), and (4) indicate colors z, w, x, y, and z, respectively.

In certain embodiments, determining the number of transmitted packets during a first interval of the plurality of intervals (such as from probe (0) to probe (1)) and determining the number of transmitted packets during a second interval of the plurality of intervals (such as from probe (1) to probe (2)) is based on a single counter maintained by the first node 102A. In other words, the same counter of the first node 102A may be used for determining the number of transmitted packets for each interval without requiring per-color counters.

As noted above, method 300 may be performed by any suitable computing system. In embodiments where the first node 102A performs method 300, the first node 102A may determine the number of transmitted packets based on reading its counter for each interval. In embodiments where another computing system performs method 300, the computing system may determine the number of transmitted packets based on a message from the first node 102A indicating the first node 102A's counter information (e.g., the first node 102A may indicate an ABtx1 counter value for a first interval, an ABtx2 counter value for a second interval, and so on).

Method 300 proceeds to step 304 with determining a number of received packets (e.g., Rx packets) that the second node 102B received from the first node 102A via the link 106 (e.g., link AB). The number of received packets is determined based on a counter maintained by the second node 102B, such as an ABrx counter. The number of received packets is determined for each interval of the plurality of intervals. As an example, a first number of received packets may be determined for the first interval, a second number of received packets may be determined for the second interval, and so on. In embodiments where the second node 102B performs method 300, the second node 102B may determine the number of received packets based on reading its counter for each interval. In embodiments where another computing system performs method 300, the computing system may determine the number of received packets based on a message from the second node 102b indicating the second node 102B's counter information (e.g., the second node 102B may indicate an ABrx1 counter value for a first interval, an ABrx2 counter value for a second interval, and so on).

In certain embodiments, determining the number of received packets during the first interval of the plurality of intervals (such as from probe (0) to probe (1)) and determining the number of received packets during the second interval of the plurality of intervals (such as from probe (1) to probe (2)) is based on a single counter maintained by the second node 102B. In other words, the same counter of the second node 102B may be used for determining the number of received packets for each interval without requiring per-color counters.

Method 300 proceeds to step 306 with determining a plurality of packet loss values. Each packet loss value is associated with a respective interval of the plurality of intervals. The determining is based on the number of transmitted packets and the number of received packets associated with the respective interval. FIG. 2B illustrates an example of determining packet loss per interval (e.g., loss of 200 packets for a first interval, (−300) packets for a second interval, 300 packets for a third interval, and 300 packets for a fourth interval).

Method 300 proceeds to step 308 with determining variability based on the plurality of packet loss values. As an example, variability may indicate when packet loss determined for a given interval is negative and/or when measured loss for a given interval differs by more than X % compared to the previous interval. FIG. 2B illustrates an example where determining variability based on the plurality of packet loss values comprises determining an average packet loss for each interval and comparing the average packet loss from one interval to the next.

Method 300 then proceeds to step 310 with configuring a value associated with reordering detection. The value is based on whether the variability exceeds a threshold. As an example, a variability (V) determined in step 308 may indicate a percentage difference associated with packet loss from one interval to the next. Step 310 may compare V to a pre-determined threshold (e.g., $V_{Threshold}$). Certain embodiments configure the value associated with reordering detection by setting a parameter (e.g., 'ReorderingDetected') to true when the variability exceeds the threshold and to false when the variability does not exceed the threshold. Any suitable format may be used to configure the true and false values. As one example, in an embodiment, a bit may be set to '0' to indicate false and to '1' to indicate true (or vice versa). In other embodiments, the value associated with reordering detection that gets configured in step 310 may be a weighting factor for determining a weighted packet loss (e.g., the weighting factor may be determined differently depending on whether or not the variability determined in step 308 exceeds the threshold).

In certain embodiments, method 300 may then proceed to step 312 with determining a weighted packet loss value associated with a sliding window. As an example, in certain embodiments, the sliding window may comprise the plurality of intervals evaluated during a current iteration of method 300. The weighted packet loss value is determined based on a weighting factor. The weighting factor depends on the value associated with reordering detection. In certain embodiments, the weighting factor favors recent measurements more heavily when the value associated with reordering detection indicates that the variability does not exceed the threshold, and the weighting factor favors recent measurements less heavily when the value associated with reordering detection indicates that the variability exceeds the threshold. As an example, as discussed with respect to FIG. 2C, if V is greater than the variability threshold ($V_{Threshold}$), then certain embodiments detect reordering variability (e.g., 'ReorderingDetected' is set to true) and configure the weighting factor as 1. If V is less than the variability threshold ($V_{Threshold}$), then certain embodiments detect no or minimal reordering variability (e.g., 'ReorderingDetected' is set to false) and configure the weighting factor as $i^2/N^2$.

Method 300 may proceed to step 314 with communicating the weighted packet loss value. The weighted packet loss may be communicated in any suitable manner. As an example, the weighted packet loss value may be communicated to a module of the first node 102A configured to adapt transmissions and/or re-transmissions of packets based on the weighted packet loss value. As another example, the weighted packet loss value may be communicated in a report or an alert to a system operator, for example, for record keeping purposes or to alert the system operator of a potential problem (e.g., if the weighted packet loss value exceeds a threshold).

Reference is now made to FIG. 4, wherein is shown an example computer system 400 which may be used by the systems and methods described herein. In particular embodiments, one or more computer systems 400 provide functionality described or illustrated herein. As an example, one or more computer systems 400 may be used to implement a node 102 or components of network 104 described with respect to FIG. 1 and/or FIGS. 2A-2C. As another example, one or more computer systems 400 may be used to perform one or more steps described with respect to FIG. 3. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A computing system, the computing system comprising:
    one or more processors; and
    one or more computer-readable non-transitory storage media comprising instructions that, when executed by the one or more processors, cause one or more components of the computing system to perform operations comprising:
        receiving a first counter from a first node, the first node comprising a first single counter maintained by the first node and configured to count first transmitted packets comprising a first type of traffic and second transmitted packets comprising a second type of traffic;
        determining, based on the first single counter, a number of transmitted packets that the first node transmitted to a second node via a link, the number of transmitted packets is determined for each interval of a plurality of intervals;
        receiving a second counter from the second node, the second node comprising a second single counter maintained by the second node and configured to count first received packets comprising the first type of traffic and second received packets comprising the second type of traffic;
        determining, based on the second single counter, a number of received packets that the second node received from the first node via the link, the number of received packets is determined for each interval of the plurality of intervals;
        determining a plurality of packet loss values based on the number of transmitted packets and the number of received packets associated with each respective interval of the plurality of intervals;
        determining variability of the plurality of packet loss values, the variability indicating a reordering detected in packets exchanged between the first node and the second node via the link within a given interval or from one interval to another interval of the plurality of intervals, the packets exchanged between the first node and the second node comprising the first type of traffic and the second type of traffic;

configuring a reordering detection value associated with reordering detection based on whether the variability exceeds a threshold;

determining a weighted packet loss value associated with a sliding window, the weighted packet loss value determined based at least in part upon a weighting factor that depends on the reordering detection value associated with reordering detection; and communicating the weighted packet loss value.

2. The computing system of claim 1, wherein each interval is indicated by a respective first probe and a respective second probe, the respective first probe and the respective second probe sent from the first node to the second node via the link, the respective first probe indicating a start of the interval and the respective second probe indicating an end of the interval.

3. The computing system of claim 2, wherein the respective first probe indicates the first type of traffic and the respective second probe indicates the second type of traffic.

4. The computing system of claim 3, wherein:

determining the number of transmitted packets for the first type of traffic during a first interval of the plurality of intervals and determining the number of transmitted packets for the second type of traffic during a second interval of the plurality of intervals is based on the first single counter maintained by the first node; and determining the number of received packets for the first type of traffic during the first interval and determining the number of received packets for the second type of traffic during the second interval is based on the second single counter maintained by the second node.

5. The computing system of claim 1, wherein configuring the reordering detection value associated with reordering detection comprises setting the reordering detection value to true when the variability exceeds the threshold and setting the reordering detection value to false when the variability does not exceed the threshold.

6. The computing system of claim 1, wherein:

the weighting factor favors recent measurements more heavily when the reordering detection value associated with reordering detection indicates that the variability does not exceed the threshold; and the weighting factor favors the recent measurements less heavily when the reordering detection value associated with reordering detection indicates that the variability exceeds the threshold.

7. A method performed by a computing system, the method comprising:

receiving a first counter from a first node, the first node comprising a first single counter maintained by the first node and configured to count first transmitted packets comprising a first type of traffic and second transmitted packets comprising a second type of traffic;

determining, based on the first single counter, a number of transmitted packets that the first node transmitted to a second node via a link, the number of transmitted packets is determined for each interval of a plurality of intervals;

receiving a second counter from the second node, the second node comprising a second single counter maintained by the second node and configured to count first received packets comprising the first type of traffic and second received packets comprising the second type of traffic;

determining, based on the second single counter, a number of received packets that the second node received from the first node via the link, the number of received packets is determined for each interval of the plurality of intervals;

determining a plurality of packet loss values based on the number of transmitted packets and the number of received packets associated with each respective interval of the plurality of intervals;

determining variability of the plurality of packet loss values, the variability indicating a reordering detected in packets exchanged between the first node and the second node via the link within a given interval or from one interval to another interval of the plurality of intervals, the packets exchanged between the first node and the second node comprising the first type of traffic and the second type of traffic;

configuring a reordering detection value associated with reordering detection based on whether the variability exceeds a threshold;

determining a weighted packet loss value associated with a sliding window, the weighted packet loss value determined based at least in part upon a weighting factor that depends on the reordering detection value associated with reordering detection; and communicating the weighted packet loss value.

8. The method of claim 7, wherein each interval is indicated by a respective first probe and a respective second probe, the respective first probe and the respective second probe sent from the first node to the second node via the link, the respective first probe indicating a start of the interval and the respective second probe indicating an end of the interval.

9. The method of claim 8, wherein the respective first probe indicates the first type of traffic and the respective second probe indicates the second type of traffic.

10. The method of claim 9, wherein:

determining the number of transmitted packets for the first type of traffic during a first interval of the plurality of intervals and determining the number of transmitted packets for the second type of traffic during a second interval of the plurality of intervals is based on the first single counter maintained by the first node; and determining the number of received packets for the first type of traffic during the first interval and determining the number of received packets for the second type of traffic during the second interval is based on the second single counter maintained by the second node.

11. The method of claim 7, wherein configuring the reordering detection value associated with reordering detection comprises setting the reordering detection value to true when the variability exceeds the threshold and setting the reordering detection value to false when the variability does not exceed the threshold.

12. One or more computer-readable non-transitory storage media embodying instructions that, when executed by a processor of a computing system, cause the performance of operations comprising:

receiving a first counter from a first node, the first node comprising a first single counter maintained by the first node and configured to count first transmitted packets comprising a first type of traffic and second transmitted packets comprising a second type of traffic;

determining, based on the first single counter, a number of transmitted packets that the first node transmitted to a second node via a link, the number of transmitted packets is determined for each interval of a plurality of intervals;

receiving a second counter from the second node, the second node comprising a second single counter maintained by the second node and configured to count first received packets comprising the first type of traffic and second received packets comprising the second type of traffic;

determining, based on the second single counter, a number of received packets that the second node received from the first node via the link, the number of received packets is determined for each interval of the plurality of intervals;

determining a plurality of packet loss values based on the number of transmitted packets and the number of received packets associated with each respective interval;

determining variability of the plurality of packet loss values, the variability indicating a reordering detected in packets exchanged between the first node and the second node via the link within a given interval or from one interval to another interval of the plurality of intervals, the packets exchanged between the first node and the second node comprising the first type of traffic and the second type of traffic;

configuring a reordering detection value associated with reordering detection based on whether the variability exceeds a threshold;

determining a weighted packet loss value associated with a sliding window, the weighted packet loss value determined based at least in part upon a weighting factor that depends on the reordering detection value associated with reordering detection; and communicating the weighted packet loss value.

13. The one or more computer-readable non-transitory storage media of claim 12, wherein each interval is indicated by a respective first probe and a respective second probe, the respective first probe and the respective second probe sent from the first node to the second node via the link, the respective first probe indicating a start of the interval and the respective second probe indicating an end of the interval.

14. The one or more computer-readable non-transitory storage media of claim 13, wherein the respective first probe indicates the first type of traffic and the respective second probe indicates the second type of traffic.

15. The one or more computer-readable non-transitory storage media of claim 14, wherein:

determining the number of transmitted packets for the first type of traffic during a first interval of the plurality of intervals and determining the number of transmitted packets for the second type of traffic during a second interval of the plurality of intervals is based on the first single counter maintained by the first node; and determining the number of received packets for the first type of traffic during the first interval and determining the number of received packets for the second type of traffic during the second interval is based on the second single counter maintained by the second node.

16. The one or more computer-readable non-transitory storage media of claim 15, wherein configuring the reordering detection value associated with reordering detection comprises setting the reordering detection value to true when the variability exceeds the threshold and setting the reordering detection value to false when the variability does not exceed the threshold.

17. The one or more computer-readable non-transitory storage media of claim 12, wherein:

the weighting factor favors recent measurements more heavily when the reordering detection value associated with reordering detection indicates that the variability does not exceed the threshold; and the weighting factor favors the recent measurements less heavily when the reordering detection value associated with reordering detection indicates that the variability exceeds the threshold.

\* \* \* \* \*